No. 680,053. Patented Aug. 6, 1901.
J. J. MADIGAN & R. W. CROCKER.
JAR OR BOTTLE CLOSURE.
(Application filed Jan. 19, 1901.)
(No Model.) 2 Sheets—Sheet 1.
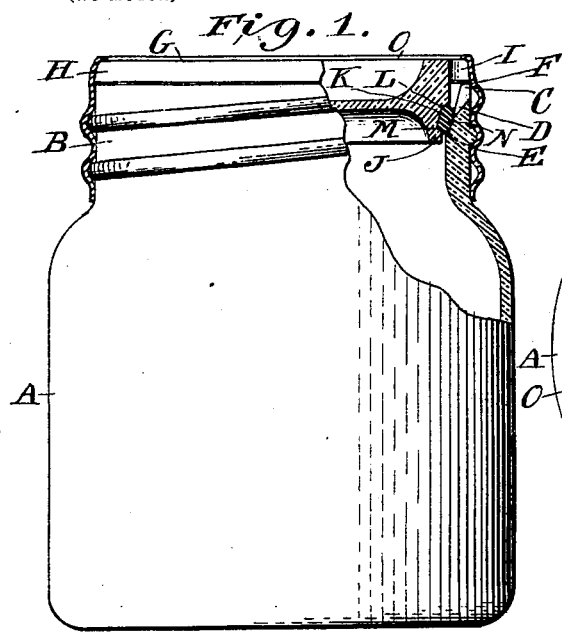
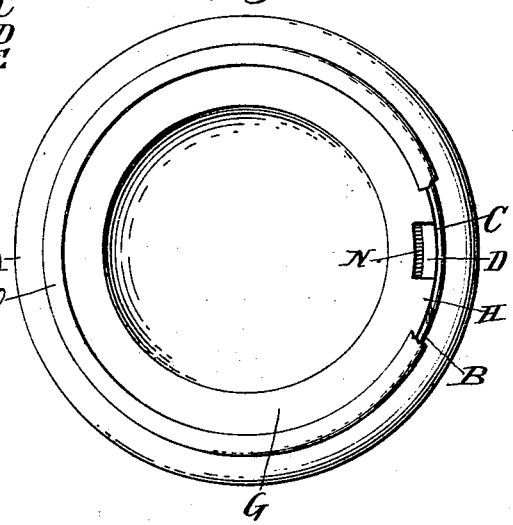
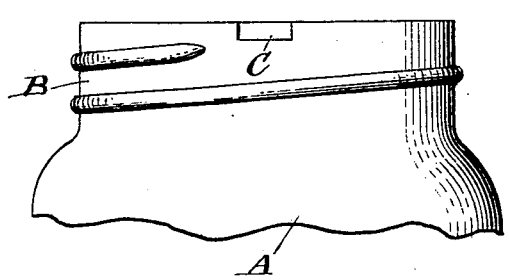
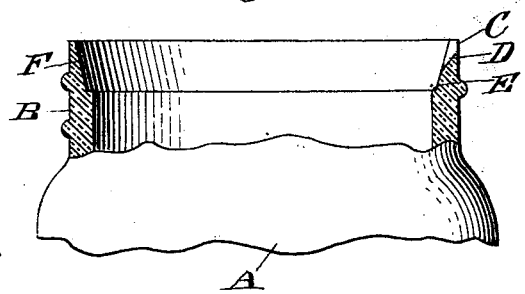
Witnesses
Walter O. Blackwood.
P. F. Gray.
Inventors
John J. Madigan
Ralph W. Crocker
by Blackwood Bros.
their Attorneys
THE NORRIS PETERS CO., PHOTO-LITHO., WASHINGTON, D. C.

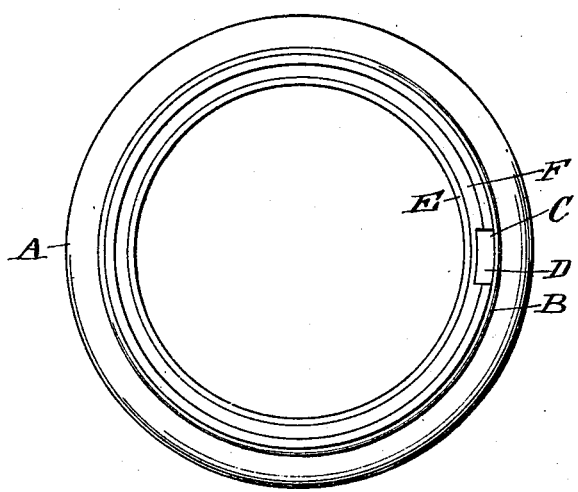
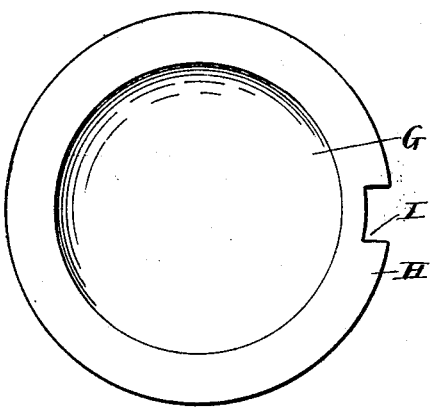
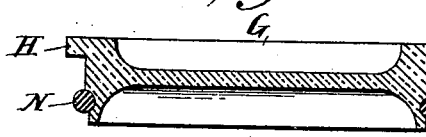
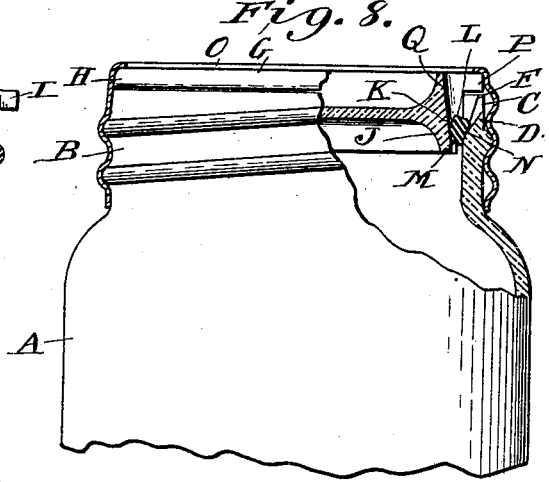
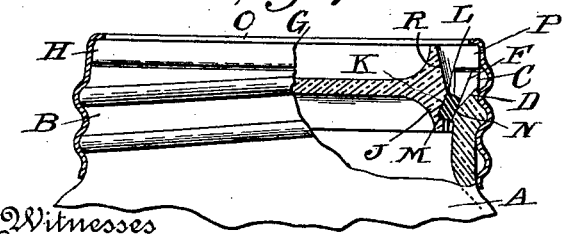

UNITED STATES PATENT OFFICE.

JOHN J. MADIGAN AND RALPH W. CROCKER, OF SEATTLE, WASHINGTON, ASSIGNORS TO THE YAKIMA VALLEY FRUIT COMPANY, OF SAME PLACE.

JAR OR BOTTLE CLOSURE.

SPECIFICATION forming part of Letters Patent No. 680,053, dated August 6, 1901.

Application filed January 19, 1901. Serial No. 43,933. (No model.)

*To all whom it may concern:*

Be it known that we, JOHN J. MADIGAN and RALPH W. CROCKER, citizens of the United States, residing at Seattle, in the county of King and State of Washington, have invented certain new and useful Improvements in Jar or Bottle Closures; and we do declare the following to be a full, clear, and exact description of the invention, such as will enable others skilled in the art to which it appertains to make and use the same.

Our invention relates to improvements in jar and bottle closures and means for removing the same.

It has for its object to provide a closure especially adapted for sealing jars in which materials are preserved by the aid of heat or other means of sterilization wherein air is exhausted from the interior of the jar and the closure held in action mainly by atmospheric pressure and to provide means whereby the closure can be readily and easily removed.

Our invention consists in the construction, combination, and arrangement of the several parts, as hereinafter more fully described and specifically claimed.

Our invention is illustrated in the accompanying drawings, in which—

Figure 1 is a side elevation, partly in section. Fig. 2 is a top plan view; Fig. 3, a side elevation of the upper portion of the jar; Fig. 4, a similar view, partly in section; Fig. 5, a top plan view of the jar with the cover and clamping-ring removed. Fig. 6 is a top plan view of the cover; Fig. 7, a section of the cover, showing a round gasket or packing-ring applied thereto; and Figs. 8 and 9, detail views, partly in section, of modifications.

Referring to the drawings, in which like letters of reference denote like parts throughout the several views, A designates a jar having a screw-threaded neck B, the upper edge of the neck being provided with a notch C, having an inwardly-beveled bottom D. The interior of the neck is provided with an annular shoulder E and an inwardly-beveled portion F, extending from the upper portion of the neck to the shoulder.

G is the cover, having a horizontal flange H, adapted to rest on the upper edge of the neck of the jar and provided with a notch I, adapted to register with the notch C in the neck of the jar, and J a flange depending from the cover and provided with a groove K, formed between shoulders L M, said groove being adapted to receive a flat, round, or other shaped gasket N, which is adapted to be seated on the shoulder E.

O is a screw-threaded clamping-ring, the threads thereof being adapted to engage the screw-threads on the neck of the jar and force the cover down in place and securely hold it.

Referring to the modifications, the jar is as hereinbefore described. In Fig. 8 a notch P is made in the cover, which extends through the shoulders L M and has an inwardly-beveled portion Q, and in Fig. 9 the cover has a notch P, provided with an inwardly-beveled portion R, which only extends through the shoulders L.

The operation of closing the jar after it has been filled is as follows: The cover is inserted into the neck as far as possible and the clamping-ring placed over it and screwed down, which forces the cover down until the flange H is seated on the upper edge of the neck and the gasket seated on the shoulder E, the gasket being thereby spread out against the interior of its groove and the neck of the bottle, making an air-tight connection between the cover and said neck. To open the jar, a knife or other instrument is inserted through the opening formed by the notches in the cover and neck and between the neck of the jar and the gasket and pressed outward. This will force the gasket out of place on its seat and destroy the vacuum, when the cover can be easily removed. In the modifications the notch in the cover is provided with an inwardly-beveled portion and the neck of the jar with a notch having an inwardly-beveled bottom, and by this arrangement the cover can be removed by inserting the instrument either between the cover and the gasket and pressed inward or between the neck of the jar and the gasket to force the gasket off its seat and destroy the vacuum.

We do not wish to be limited to the precise construction as herein shown and described, as the same may be varied somewhat without departing from the spirit of our invention.

Having thus described our invention, what we claim is—

1. A jar provided with a notch in its upper edge, a cover having a notch adapted to register with the notch in said jar, a gasket, said notches registering to allow the insertion of an instrument therethrough and between the gasket and the jar and means for clamping said cover in place, substantially as described.

2. A jar provided with a notch in its edge, a shoulder on its interior, and a beveled portion extending from the upper edge of the jar to said shoulder, and a cover provided with a notch, said notches adapted to register with each other, and a gasket, substantially as described.

3. A jar provided with a notch in its edge the bottom of which is beveled inwardly, a cover having a notch adapted to register with the notch in said jar, and a gasket, substantially as described.

4. A jar having a shoulder on its interior, and provided with a notch in its upper edge the bottom of which is beveled inwardly, a cover having a notch adapted to register with the notch in said jar, a gasket, and means adapted to seat said gasket on said shoulder, substantially as described.

5. A jar provided with a notch in its edge the bottom of which is beveled, and a cover having a notch with a beveled portion, said notches adapted to register and the beveled portions to extend toward each other, and a gasket, substantially as described.

In testimony whereof we affix our signatures in the presence of two witnesses.

JOHN J. MADIGAN.
RALPH W. CROCKER.

Witnesses:
RICHARD SAXE JONES,
BERNICE H. MCLACHLAN.